US005651113A

United States Patent [19]
Lin et al.

[11] Patent Number: 5,651,113
[45] Date of Patent: Jul. 22, 1997

[54] METHOD AND APPARATUS FOR INDICATING A TIME-OUT BY GENERATING A TIME STAMP FOR AN INPUT/OUTPUT (I/O) CHANNEL WHENEVER THE CHANNEL PROCESSES AN INSTRUCTION

[75] Inventors: David H. Lin, Santa Clara; James E. Brogan, Morgan Hill; Matthew G. Noel, Boulder Creek, all of Calif.

[73] Assignee: Amdahl Corporation, Sunnyvale, Calif.

[21] Appl. No.: 641,142

[22] Filed: Apr. 25, 1996

Related U.S. Application Data

[62] Division of Ser. No. 431,472, May 1, 1995, Pat. No. 5,581,794, which is a continuation of Ser. No. 993,081, Dec. 18, 1992, abandoned.

[51] Int. Cl.$^6$ .................................................. G06F 11/00
[52] U.S. Cl. ........................ 395/185.09; 371/20.1; 371/62; 395/878; 395/555
[58] Field of Search ................ 371/20.1, 61, 62; 395/185.08, 185.09, 825, 826, 865, 866, 878, 183.1, 727, 550

[56] References Cited

U.S. PATENT DOCUMENTS 3,723,975  3/1973  Kurtz, Sr. et al. ............... 395/185.08
4,090,239  5/1978  Twibell et al. .................... 395/550
4,099,255  7/1978  Stanley et al. .................... 395/735
4,220,990  9/1980  Alles ................................. 395/550
4,327,409  4/1982  Maruoka et al. ................. 395/183.1
5,404,356  4/1995  Abe ................................... 395/185.08

*Primary Examiner*—Lance Leonard Barry, Esq.
*Attorney, Agent, or Firm*—Fliesler, Dubb, Meyer & Lovejoy

[57] ABSTRACT

A channel time-out apparatus in a data processing system having a channel processor for controlling the allocation of a plurality of input/output channels. The channel time-out apparatus comprises a clock for generating time indications, an address generator for generating an address for each input/output channel of the plurality of input/output channels, a time-out generator for generating a time-out indicator for an input/output channel whenever that input/output channel processes an instruction, storage for storing the last time-out indicator generated by the time-out means for each input/output channel and a comparator for comparing the last time-out indicator stored in the storage for the input/output channel whose address is presently being generated by the address generator with a time indicator presently being generated by the clock for determining when a time-out event has occurred without requiring intervention by the processor.

15 Claims, 4 Drawing Sheets

METHOD AND APPARATUS FOR INDICATING A TIME-OUT BY GENERATING A TIME STAMP FOR AN INPUT/OUTPUT (I/O) CHANNEL WHENEVER THE CHANNEL PROCESSES AN INSTRUCTION

This application is a divisional of Ser. No. 08/431,472, filed May 1, 1995, now U.S. Pat. No. 5,581,794, which is a continuation of Ser. No. 07/ 993,081, filed Dec. 18, 1992, now abandoned.

BACKGROUND OF THE INVENTION

1. Technical Field

The present invention relates to data processing systems and, more specifically, to input/output channel processing in such a system.

2. Description of the Related Art

Referring to FIG. 1, a block diagram representative of a prior art input/output (I/O) processor 50 is shown. The I/O processor 50 is of a type provided between a central processing unit ("CPU") and input/output devices in a large scale data processing system. The processor 50 consists of a channel manager 51 (in communication with the CPU), a channel processor 53 and a plurality of interface controllers 71–78.

Each of the plurality of interface controllers 71–78 is responsible for controlling the transmission of data in a plurality of I/O channels 60, for example, 16 channels. In one prior art embodiment, there are 8 interface controllers 71–78, each controlling 16 channels, for a total of 128 channels. Connection to any one of these channels may be had through a port 81 external to the data processing system.

Each of the interface controllers 71–78 contains a microcode program for controlling data transmission in all of the channels in that controller. Essentially, each channel has an instruction pointer which points to its current micro-code instruction. A controller performs one micro-code instruction for one channel during a first clock cycle, increments the instruction pointer for that channel and then moves on to the next channel, performs one instruction for that channel and increments its instruction pointer during the next clock cycle, and moves on to a subsequent channel in a subsequent clock cycle and repeats this process. All 16 channels in a controller 71–78 are processed in this sequential, time-sliced manner wherein one instruction per channel is performed per system clock cycle. Since there are 16 channels per controller, this means that an instruction for a particular channel is executed once every 16 system clock cycles.

Among the functions provided by each of the interface controllers is channel time-out monitoring. Time-out is an event known in the art and generally refers to a situation in which a signal has been transmitted and a response to the transmitted signal is due. If the response is not received within a predetermined amount of time, a time-out signal is issued indicating that the response has not timely come.

The time-out mechanism in an interface controller 71–78 is implemented by establishing a time-out period that is equal to a multiple of the system clock cycle time and decrementing (or incrementing) this period for a number of clock cycles equal to that multiple. For example, in a processor operating at 100 megahertz MHz, the cycle time is 10 nanoseconds ns. Since a decrement instruction for a specific channel would be executed one every 16 cycles, the decrement of one would be equal to 10 ns×16 or 160 ns. An established time-out period is then divided by 160 ns to determine the number of decrement instructions the processor of an interface controller must execute to arrive at a quantity equal to the time-out limit. For example, if the time-out limit is established to be 800 microseconds ("μs"), an interface controller will have to execute 5,000 decrement (or increment) instructions before a time-out occurs.

Given this large number of counting instructions, it is likely that a majority of processor time for each of the interface controllers 71–79 is spent executing a count operation, a relatively trivial operation for a processor.

Referring to the channel processor 53, the channel processor controls the allocation of all of the 128 input/output channels. Control signals are passed between each of the interface controllers 71–78 and channel processor 53. The channel processor functions, with respect to time-out, in a manner similar to that of the interface controllers 71–78. Instructions for each of the 128 channels are executed in a time sliced manner. Due to the aggregate number of channels, however, the channel processor 53 is effectively performing one instruction per channel every 128 cycles. This may be disadvantageously slow in some applications.

Furthermore, during normal operation of a data processing system, only a small number of channels are actually transmitting data at any given time. The channel processor 53 may be performing a time-out count for the vast majority of channels. Having a processor simply execute a count for, for example, 100 out of 128 channels is an inefficient use of the processor.

SUMMARY OF THE INVENTION

The present invention overcomes the shortcoming of the prior art by providing a channel time-out mechanism configured essentially in hardware and separated from the channel processor, permitting the channel processor to maintain a wait state, through essentially all of channel time-out processing.

This is accomplished, in essence, by having an event driven time-out mechanism as compared to the countdown or countup mechanisms of the prior art in which the controlling processor was used to execute count instructions.

Referring in more detail to one embodiment of the present invention, a timing mechanism having a counter is provided. The counter sequences through a count which in one part indicates a relative time indication determined by the rate at which it is incremented and a second part having a unique count for each of the I/O channels. When an instruction is performed for a channel, the time indication for that channel is stored. Subsequently, that stored timestamp is compared to a current timestamp. Once a sufficient difference exists between these two timestamps, a time-out is issued.

The initiation of a comparison is brought about by that part of the counter having a count corresponding to each of the plurality of channels. When that count is incremented, a comparison of timestamps for the channel corresponding to the new count is undertaken.

In one embodiment of the present invention, a stored timestamp is incremented by the time-out amount when it is being stored. In a subsequent comparison, if the stored timestamp is equal to the current timestamp, then an amount of time equal to the increment must have elapsed, thus indicating a time-out.

DETAILED DESCRIPTION

The present invention is particularly suited for application in a data processing system or a large scale data processing system. For that reason, an overview of such a system is presented with reference to FIG. 2, followed by a detailed description of the present invention within such a system.

Figure 1:
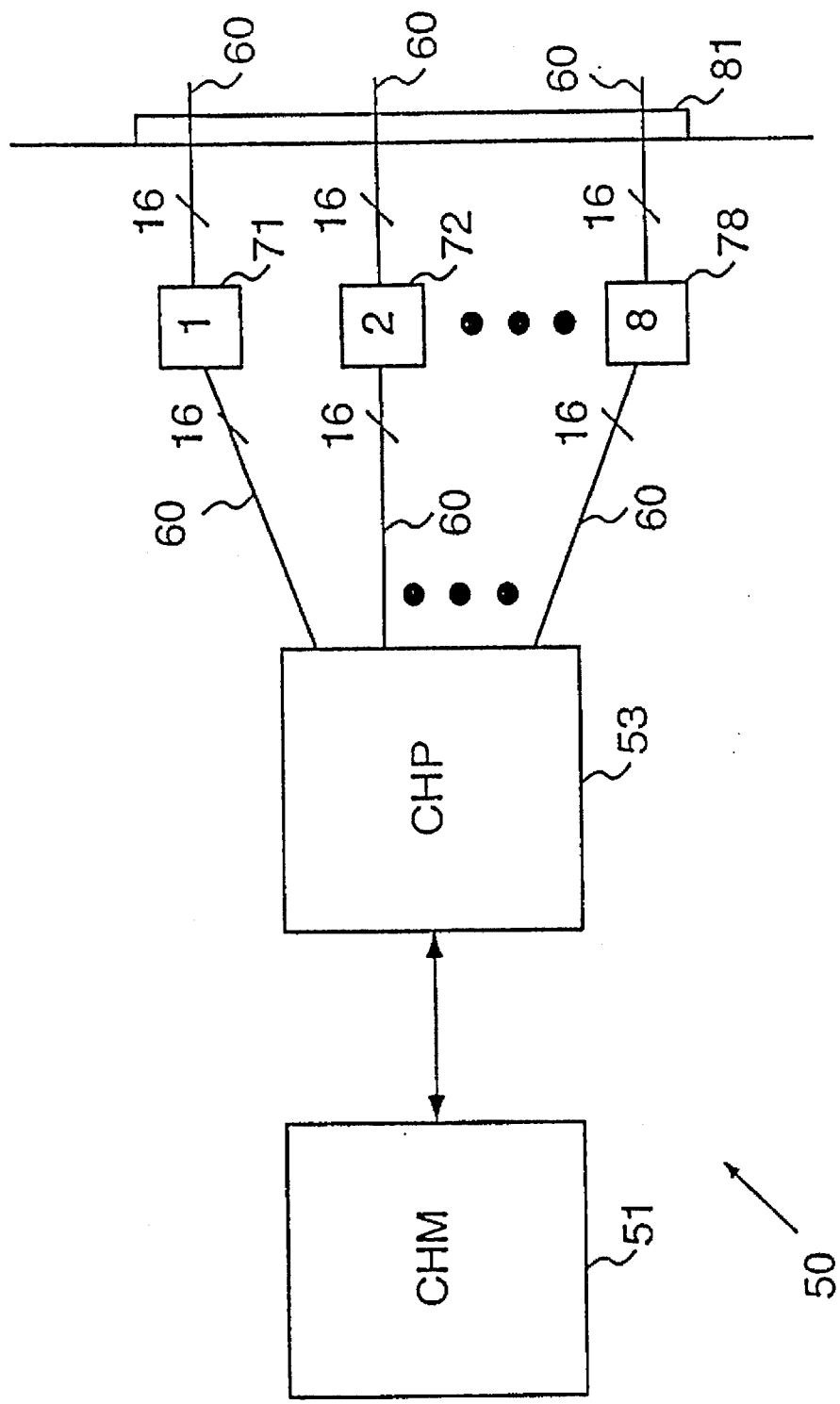
FIG. 1 is a block diagram representative of a prior art I/O processor.
Figure 2:
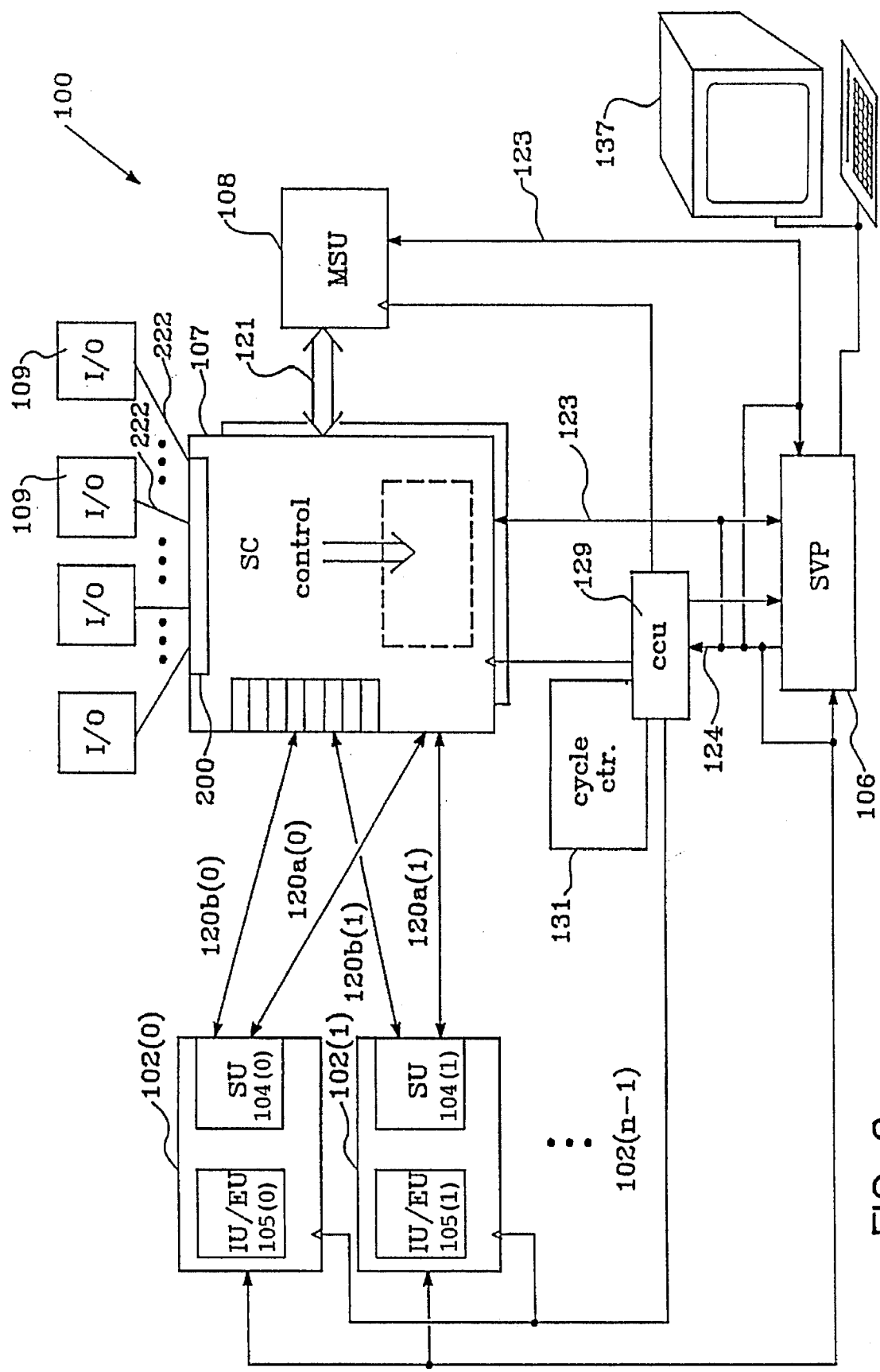
FIG. 2 is a block diagram of a multi-CPU data processing system.

Referring to FIG. 2, a multi-CPU data processing or computer system 100 is illustrated. The system 100 includes a plurality of central processing units 102(0) to 102(n–1), each having a storage unit 104 with a cache and an instruction unit 105. Each of the CPUs is coupled to a system control unit 107 across data lines 120a and control lines 120b. The data lines 120a(0) to 120a(n–1) transmit data to and from the system control unit 107 and the storage unit of each CPU 102. The control lines 120b transmit address, opcodes and controls between these two entities 107 and 102.

The system control unit 107 includes an interface 121 to a main store unit 108 and contains the I/O processor 200 which controls input and output operations over the I/O channels 222 to the I/O devices 109. The system control unit 107 controls access to data among the CPUs and the main storage unit 108 and performs data transfers between the I/O device and the main store unit 108, invoking the I/O processor 200.

A service processor 106 is coupled to all of the functional units of the computer system 100 by scan interface 123, or otherwise as known in the art. The scan interface 123 provides access to data locations in the CPUs or system control units themselves. The service processor 106 is thereby able to scan data indicating a state of the computer system. The service processor is also able to write data into specific data locations within the functional units of the system using a known scan-in technique. A clock control unit 129 is shown isolated from other units, but may be located on one of the functional units such as the system control unit 107. In response to the reception of an error signal over interface 123, the CCU 129 disables the system clock and the service processor 106 invokes a recovery algorithm. After processing the error, which includes logging error information and recovering a proper system state, the service processor 106 sends a signal to the CCU 129 to restart the service clock.

Figure 3:
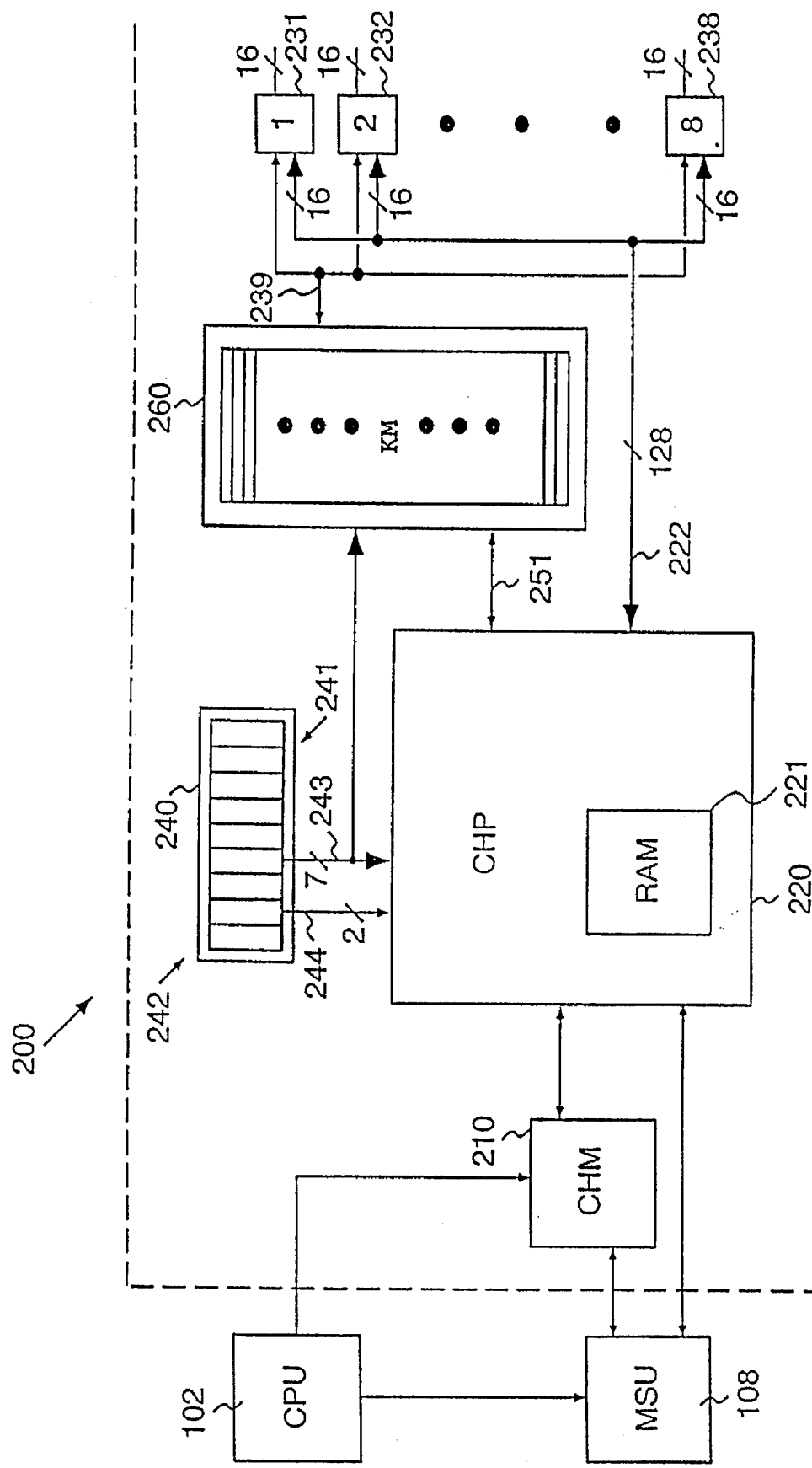
FIG. 3 is a block diagram of an I/O processor.

Referring to FIG. 3, a block diagram of an I/O processor 200 is shown. The processor 200 comprises a channel manager (ChM) 210 which is in communication with a CPU 102 and the main storage unit 108 through the system controller 107 (not shown). A channel processor (ChP) 220 having random access memory (RAM) 221 is in communication with the channel manager 210 and main storage unit 108. The channel processor 220 is also in communication with a plurality of interface controllers 231–238, a kick machine (km) 260, a timer 240 and the input/output channels 222.

The number of I/O channels 222 may vary considerably, but for purposes of the present discussion, the processor 200 will be selected to have 128 channels. The kick machine 260 includes a two-dimensional array, having one-dimension equal to 1 and the other dimension equal to the number of I/O channels 222. Thus, in the present embodiment, the array is 1×128. The kick machine 260 is in communication with each of the interface controllers 231–238 and the channel processor 220 and indicates to the channel processor 220, via a processor scan of the array, those channels which require attention.

The timer 240 is a 9 bit counter in which the 7 least significant bits 241 cycle through a count of 128, where each counts represents a specific one of the 128 I/O channels 222. The two most significant bits 242 constitute a "timestamp." The timestamp is incremented by 1 upon the completion of each count of 128 by the least significant bits 241. The channel identifying count is propagated over line 243 to the channel processor 220 and the kick machine 260 and the timestamp is propagated over line 244 to the channel processor 220.

When an I/O action is to be performed, a CPU 102 designates the area in the main storage unit 108 that is implicated and communicates the type of transfer to be performed to the channel manager 210. In a data transfer, such as one to an I/O device 109, the ChM 210 is signaled by the CPU 102 when the data is ready and thereafter the ChM 210 fetches some control information and tables which it uses to select a channel in the ChP 220. The ChM 210 then signals the appropriate channel in the ChP 220 to begin fetching channel control words and data for the I/O operation. The specified channel in the ChP is hardwired to a corresponding IFC 231–238 channel. The ChM 210 selects an appropriate channel based on control informations and talks passed to it by the CPU.

During a data-out transfer, data is normally transferred between RAM 221 and the interface controller 231–238 of the selected channel in a block of 128 bytes. This block is transferred one byte at a time from the interface controller to the I/O device.

Conversely, when data is transferred in from an I/O device, the interface controller responsible for the channel over which the data was received sends a notice to the kick array 260 that that channel requires servicing. This signal is usually sent after the interface controller has received 128 bytes of data so that the 128 bytes may be transferred as a block between the interface controller and RAM 221. The channel processor cyclically integrates the kick machine 260 and upon detecting the request for service for the particular channel, performs the requisite function, in this case, a transfer of 128 bytes of data from the interface controller of that channel into RAM 221.

Referring now to channel time-out, performing channel time-out in such an I/O processor 200 is performed generally as follows. The timer 240 is continually cycling through its count, incrementing by one at a rate of approximately 128 microseconds ($\mu$s). Since the channel count 241 has 7 bits and $2^7$ equals 128, a complete count is performed every 128 $\mu$s×128) or 16.384 milliseconds (ms). The timestamps 242 consists of 2 bits which are thus incremented by one every 16.384 ms.

Every time the channel processor 220 completes an instruction for a channel, such as transfer data-in, transfer data-out, etc., the processor saves the current timestamp 242 (plus two) for that channel in a memory location in RAM 221 dedicated to that channel's timestamp. This stored timestamp will be compared to the current timestamp indicated by the two most significant bits 242 when the channel count 241 is equal to a count designating that channel. For example, if data is transferred in on channel 56, the channel processor 220 will store the current timestamp 242 for channel 56 upon executing the data-in instruction. The next time the channel count 241 indicates channel 56, a hardware implemented comparison is done which compares the stored timestamp for channel 56 with the current value in the timestamp or two most significant bits 242 of the timer 240. When a sufficient change has occurred between these two values indicating a specific amount of time, a time out is indicated. In one embodiment, 16.384 ms is appropriate for a time-out. If a difference in two between the stored timestamp and the current timestamp is detected, this constitutes at least a time lapse greater than 16.384 ms because this ensures that at least one full channel count cycle of 16.384 ms has been completed.

To increase this time-out, either the rate at which the channel count is incremented could be decreased or the difference between the stored and current timestamp that constitutes a time-out could be set to be greater than two. Conversely, to decrease the time-out limit, the speed at which the channel count is incremented could be increased.

One aspect of this embodiment is that the comparison and time-out signal generation can be done in hardware without implicating the channel processor 220. More explicitly stated, the comparison is performed without taking the channel processor out of a wait state. Thus, the channel processor is available for more effective use.

Figure 4:
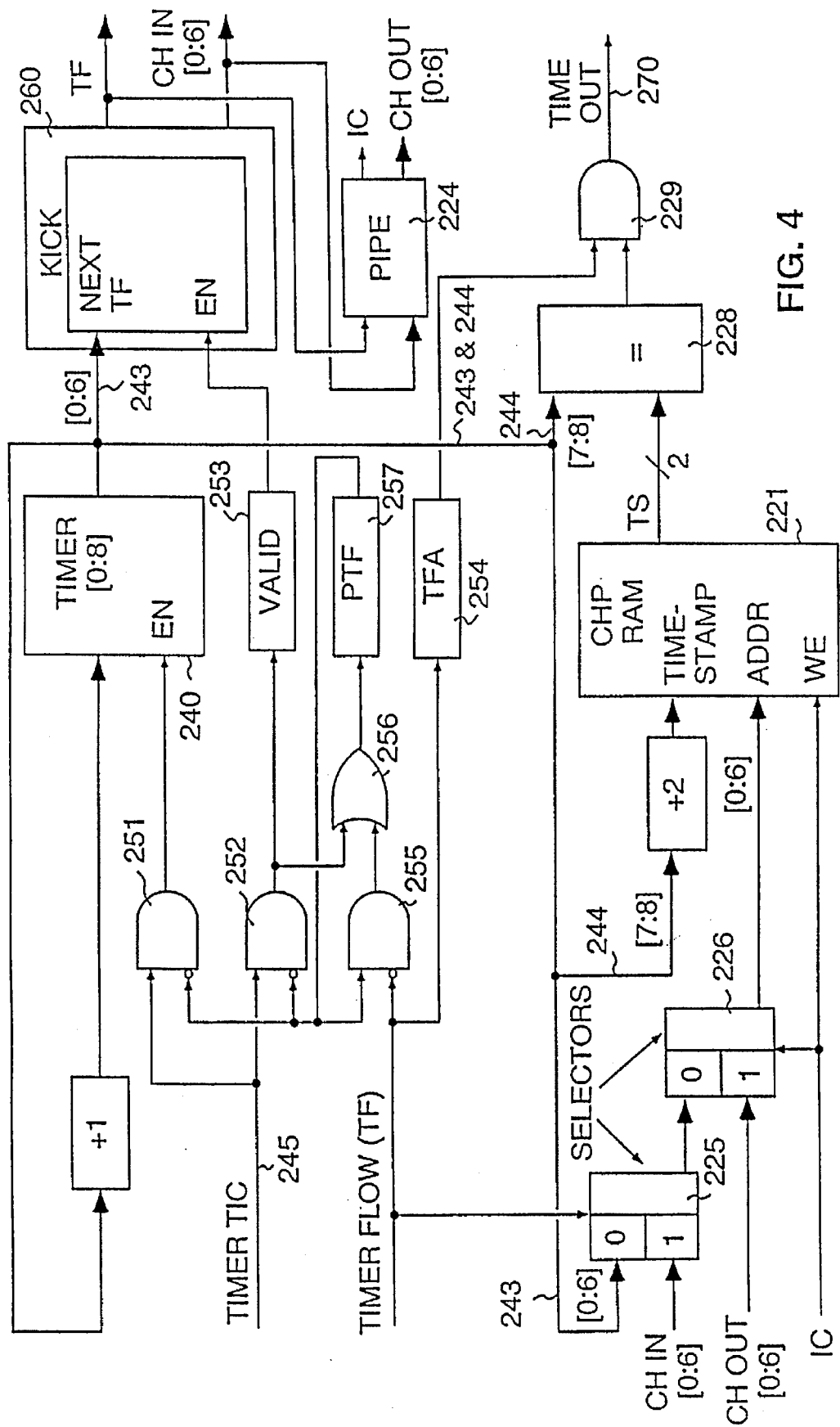
FIG. 4 is a schematic diagram of a I/O time-out mechanism.

Referring to FIG. 4, a more detailed schematic diagram of the time-out mechanism of the I/O processor 200 is shown. The 128 μs counter increment pulse (Timer TICK) is received over line 245 from a CPU and is input to the timer 240 through enabling AND-gate 251. The Timer TICK is also input through an enabling AND-gate 252 to a valid latch 253. The output of the valid latch 253 indicates to the kick machine 260 that a newly incremented count is available at the timer 240. The output of the timer has two parts, as indicated in FIG. 3. The least significant part 243 which indicates one of the 128 channels is connected to the kick machine 260 and a 2-to-1 multiplexer 225.

The kick machine 260 outputs a Timer Flow which indicates that a timestamp comparison is to be performed and the identity of a channel requesting service, Channel-In [0:6]. The Timer Flow signal is input to a ChP pipeline processor 224, a timer flow latch 254, through AND-gate 255 and OR-gate 256 to pending timer flow latch 257 and to multiplexer 225, where it functions as a select. The Channel-In [0:6] signal is connected to the other input of multiplexer 225 and to the pipeline processor 224.

The pipeline processor 224, which is effectively the main processor of the ChP 220 generates an instruction complete signal when it has completed executing an instruction for a particular channel. This signal is transmitted to the RAM 221 write enable along with an indication as to which channel the recently completed instruction was for, Channel-Out [0:6]. The present timestamp plus two is written to the address indicated by Channel-Out [0:6], upon the issuance of an instruction complete write enable. The instruction complete signal serves as a select to multiplexer 226 to which is input Channel-Out [0:6] and the output of multiplexer 225.

The circuitry of FIG. 4 functions generally as follows. A Timer TICK is received on line 245 and propagated to timer 240 causing it to increment by 1, assuming AND-gate 251 is enabled. The valid latch 253 is also set by the Timer TICK causing a valid signal to be sent to the kick machine 260. The valid signal indicates that a new count is available for a time-out comparison. The channel for which the comparison is to be performed, output over line 243, is also provided to the kick machine 260. Priority logic (not shown) in the kick machine then determines if the prescribed channel is available for a comparison. When it is, a Timer Flow pulse, active low, is transmitted which sets the pending timer flow latch 257, disabling further input to the timer 240 or valid latch 253 until the present comparison is complete. The Timer Flow signal is also propagated to latch 254 where it serves as an enable through AND-gate 229 to the time-out comparator 228. The pending timer flow latch 257 is reset after completion of time-out comparison.

During a comparison, the least significant portion 243 of timer 240 is selected by the Timer Flow signal to pass through multiplexer 225, and it is further passed through multiplexer 226 to form the address input of RAM 221. The timestamp at this address (which was incremented by two during the write operation, as will be discussed below) is read out and compared at comparator 228 with the present timestamp. If the present timestamp is equal to the stored timestamp, then it actually greater by a count of 2, since this value was added to the stored timestamp. In this event, a time-out signal is generated and propagated over line 270 to the service processor 106.

Referring now to the process for storing of a timestamp, upon the completion of an instruction for a particular channel, the Channel-Out signal [0:6] which identifies that channel, and the instruction complete signal are propagated to the RAM 221. The instruction complete signal acts as a select to multiplexer 226, selecting Channel-Out as the RAM address. The Instruction Complete signal is also the write enable to the RAM, which upon its issuance, causes the current timestamp at line 244, incremented by two, to be written at the location specified by Channel-Out [0:6]. The increment of 2 is performed by an adder, or the like. During the write operation, a program counter for the specified channel is also saved. The Channel-In signal is provided to access the stored program counter for the next channel to be serviced by the ChP 220. A channel that requires servicing so indicates to the kick machine 260 as discussed above with reference to FIG. 3. The Channel-In [0:6] signal output from the kick machine 260 indicates this channel and is passed through multiplexers 225 and 226 to RAM, wherein the program counter for the specified channel is read out for processing of an instruction by processor 224.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. A channel time-out apparatus in a data processing system having a channel processor for controlling the allocation of a plurality of input/output channels, said channel time-out apparatus comprising:

a clock for generating time indications;

an address means for generating an address for each input/output channel of said plurality of input/output channels;

time-out means for generating a time-out indicator for an input/output channel of said plurality of input/output channels whenever said input/output channel processes an instruction;

storage means for storing the last time-out indicator generated by said time-out means for each said input/output channel; and comparison means for comparing said last time-out indicator stored in said storage means for said input/output channel whose address is presently being generated by said address means with a time indicator presently being generated by said clock for determining when a time-out event has occurred without requiring intervention by said processor.

2. The apparatus of claim 1 further comprising:

a counter wherein m high order bits of said counter forms said clock and n low order bits of said counter forms said address means where said clock is incremented when the value of said n low order bits of said counter are all equal to zero.

3. The apparatus of claim 1 wherein said address means sequentially generates said addresses of said plurality of input/output channels.

4. The apparatus of claim 1 wherein:

said address means cyclically and sequentially generates the addresses of said plurality of input/output channels and steps said clock upon the initiation of each cycle of addresses generated for said plurality of input/output channels.

5. The apparatus of claim 1 wherein said time-out means generates a time-out indicator for an input/output channel by adding a constant to said time indicator generated by said clock.

6. The apparatus of claim 5 wherein said constant has a value greater than one.

7. The apparatus of claim 1 wherein said time-out means generates a time-out indicator for a first input/output channel while said address means generates an input/output channel's address for a second input/output channel.

8. The apparatus of claim 1 wherein said time-out means generates a time-out indicator for an input/output channel upon the conclusion of the processing of an instruction by said input/output channel where said generated time-out indicator set the time by which a next instruction to be processed by said input/output channel is to be completed.

9. A method for determining if an instruction processed by an input/output channel has not been timely completed in a data processing system having a channel processor for controlling the allocation of a plurality of addressable input/output channels, said method comprising the steps of:

generating time indications;

generating an address for an input/output channel of said plurality of input/output channels;

generating a time-out indicator for an input/output channel of said plurality of input/output channels during the processing of each instruction processed by said input/output channel;

storage means for storing the last time-out indicator generated for each said input/output channel; and comparing said last time-out indicator stored in said storage means for said input/output channel presently being addressed with a present generated time indicator for determining when a time-out event has occurred without requiring intervention of said processor.

10. The method of claim 9 wherein the step of generating an address sequentially and cyclicly generates the addresses of said plurality of input/output channels.

11. The method of claim 10 wherein the step of generating said time indicators comprises the step of:

increasing a value of said time indicator upon the initiation of each cycle of addresses generated for said plurality of input/output channels.

12. The method of claim 11 wherein the step of generating a time-out indicator for an input/output channel comprises the step of:

adding a constant to said present generated time indicator.

13. The apparatus of claim 12 wherein said step of adding adds constant having a value greater than one.

14. The method of claim 9 wherein said step of generating said time-out indicator for an input/output channel is performed independently of said input/output channel address being generated by said step of generating an address.

15. The method of claim 9 wherein said step of generating said time-out indicator generates a time-out indicator for an input/output channel upon the conclusion of processing an instruction by said input/output channel.

* * * * *

UNITED STATES PATENT AND TRADEMARK OFFICE
CERTIFICATE OF CORRECTION

PATENT NO. : 5,651,113
DATED      : July 22, 1997
INVENTOR(S) : David H. Lin et al.

It is certified that error appears in the above-indentified patent and that said Letters Patent is hereby corrected as shown below:

Column 8, line 21, "cyclicly" should be --cyclically--;

Column 8, line 33, after "adds" insert --a--.

Signed and Sealed this

Twenty-fifth Day of August, 1998

Attest:

BRUCE LEHMAN

Attesting Officer     Commissioner of Patents and Trademarks